United States Patent
Siskin et al.

(10) Patent No.: US 8,480,765 B2
(45) Date of Patent: Jul. 9, 2013

(54) BIOMASS OIL CONVERSION PROCESS

(75) Inventors: Michael Siskin, Westfield, NJ (US);
Glen E. Phillips, Goldvein, VA (US);
Simon R. Kelemen, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 329 days.

(21) Appl. No.: 13/038,010

(22) Filed: Mar. 1, 2011

(65) Prior Publication Data

US 2011/0232161 A1    Sep. 29, 2011

Related U.S. Application Data

(60) Provisional application No. 61/317,557, filed on Mar. 25, 2010.

(51) Int. Cl.
*C10L 1/00* (2006.01)

(52) U.S. Cl.
USPC ............... 44/605; 44/307; 44/308; 44/606; 585/240; 585/242; 585/357; 585/408; 585/638; 585/733

(58) Field of Classification Search
USPC ............... 44/307–308, 605–606; 585/240, 585/242, 357, 408, 638, 733
See application file for complete search history.

(56) References Cited

U.S. PATENT DOCUMENTS

| 2008/0016769 A1* | 1/2008 | Pearson | 48/197 R |
| 2008/0071125 A1* | 3/2008 | Li | 585/361 |

OTHER PUBLICATIONS

Goldstein, I.S. (1981). Organic Chemicals from Biomass, CRC Press, 310 pgs.*

* cited by examiner

*Primary Examiner* — Brian McCaig
(74) *Attorney, Agent, or Firm* — Glenn T. Barrett; Malcolm D. Keen

(57) ABSTRACT

Biomass pyrolysis oil is converted into precursors for hydrocarbon transportation fuels by contacting the oil with liquid superheated water or supercritical water to depolymerize and deoxygenate the components of the oil and form the transportation fuel precursors. Temperatures above 200° C. and preferably above 300° C. are preferred with supercritical water at temperatures above 374° C. and pressures above 22 MPA providing the capability for fast conversion rates.

18 Claims, No Drawings

BIOMASS OIL CONVERSION PROCESS

CROSS REFERENCE TO RELATED APPLICATIONS

This application relates and claims priority to U.S. Provisional Patent Application No. 61/317,557, filed on Mar. 25, 2010. This application is also related to U.S. patent application Ser. No. 13/037,938, entitled "Biomass Conversion Process" filed on Mar. 1, 2011, which claims priority to U.S. Provisional Patent Application No. 61/317,545, filed on Mar. 25, 2010.

FIELD OF THE INVENTION

The present invention relates to a process for the production of transportation fuels by the conversion of biomass pyrolysis oils.

BACKGROUND OF THE INVENTION

Petroleum is currently estimated to account for over 35% of the world's total commercial primary energy consumption. Coal ranks second with 23% and natural gas third with 21%. The use of liquid hydrocarbon fuels on an enormous scale for transportation has led to the depletion of readily accessible petroleum reserves in politically stable regions and this, in turn, has focused attention, economically, technically and politically on the development of alternative sources of liquid transportation fuels. Liquid hydrocarbons are far and away the most convenient energy sources for transportation in view of their high volumetric energy. The energy density of gasoline, for example at about 9 kWh/litre and of road diesel at about 11 kWh/litre, far exceeds that of hydrogen (1.32 kWh/litre at 680 atm, or batteries, 175 Wh/kg. Furthermore, the liquid hydrocarbon fuel distribution infrastructure is efficient and already in place.

Production of liquid fuels from biomass can help solve the problem of $CO_2$ emission from the transportation sector because $CO_2$ released from vehicle exhaust is captured during biomass growth. While direct, carbon-neutral use of biomass as fuel is established, for example, biodiesel, this route is limited because the limited choice of source materials, e.g. vegetable oils. Conversion of a wider variety of biomass sources into more traditional types of fuel, principally hydrocarbons, is the more attractive option.

Currently, there are two major routes for conversion of biomass to liquid fuels: biological and thermo-chemical. In the biological process, fermentation of easily fermentable plant products, such as, for example, sugars to alcohols is achieved. These easily fermentable plant products can be extracted from corn kernels, sugar cane and etc. The major disadvantage of this pathway is that only a fraction of the total carbon in biomass is converted to the final desired liquid fuel. It has been calculated that conversion of all corn produced in USA to ethanol can meet 12% of entire US demand for gasoline which reduces to 2.4% after accounting for fossil fuel input required to produce the ethanol.

One well-established route to the production of hydrocarbon liquids is the gasification of carbonaceous materials followed by the conversion of the produced synthesis gas to form liquids by processes such as Fischer-Tropsch and its variants. In this way, solid fuels such as coal and coke may be converted to liquids. Coal gasification is well-established, being used in many electric power plants and the basic process can proceed from just about any organic material, including biomass as well as waste materials such as paper, plastic and used rubber tires. Most importantly, in a time of unpredictable variations in the prices of electricity and fuels, gasification systems can provide a capability to operate on low-cost, widely-available coal reserves. Gasification may be one of the best ways to produce clean liquid fuels and chemical intermediates from coal as well as clean-burning hydrogen which also can be used to fuel power-generating turbines or used in the manufacture of a wide range of commercial products. Gasification is capable of operating on a wide variety of input materials, can be used to produce a wider variety of output fuels, and is an extremely efficient method of extracting energy from biomass. Biomass gasification is therefore technically and economically attractive as an energy source for a carbon constrained economy.

The conversion of biomass to hydrocarbon transportation fuels by the gasification-liquefaction sequence has, however, certain limitations both technically and economically. First, the conversion of the biomass to synthesis gas requires large process units, high in capital cost to deal with the enormous volumes of gas generated in the process. Second, the gas-to-liquid conversion uses catalysts which may, for optimum results, use noble metal components and accordingly be very expensive. Third, and by no means least is the fact that enormous biological resources are needed to supply current consumption levels. An approximate estimate for the land area required to support the current oil consumption of about 2 million cubic metres per day by the US transportation sector is of the order of 2.67 million square km which represents 29% of the total US land area, using reasonable assumptions for the efficiency of the conversion process, thus suggesting that large scale production of liquid fuels from such a biomass conversion process is impractical. Substitution of a part of the transportation fuel demand by biological materials would, however, constitute a worthwhile economic, political and environmental advance.

Biomass oil provides one of the options which are being considered as a source of synthetic petroleum substitutes for fuel uses. It may be extracted by biomass-to-liquid technology involving destructive distillation of dried biomass in a reactor at temperature of about 500° C. with subsequent cooling. Biomass oil produced by rapid pyrolysis has been produced commercially on a small scale. Pyrolysis oil is a kind of tar and normally contains high levels of oxygen which preclude it from being considered as a direct hydrocarbon substitute. It is hydrocarbon insoluble, viscous, contains upwards of 20 wt % water along with 40-50 wt % organic oxygen compounds that decrease the heating value, and is unstable because sediment is formed via e.g., phenol-formaldehyde resin forming reactions that lead to coke formation on heating. Biomass oil produced by hydrothermal liquefaction is a higher grade hydrocarbon soluble oil with only about 15 wt % oxygen-containing organic compounds. Previous attempts to commercialize this approach have failed due to the high water usage and inability to feed the biomass effectively into the processing unit.

SUMMARY OF THE INVENTION

We have now found that biomass pyrolysis oil may be effectively converted into a precursor for hydrocarbon liquid transportation fuels by a simple, environmentally-acceptable process which does not rely upon gasification and which uses cheap, readily available materials in the conversion. While the limited availability of biomass precludes the process from addressing any large proportion of total transport energy needs, it does provide a route for using available resources efficiently and economically.

According to the present invention, biomass pyrolysis oil is converted into precursors for hydrocarbon transportation fuels by the use of superheated and/or supercritical water to depolymerize and deoxygenate the components of the oil into the transportation fuel precursors.

DETAILED DESCRIPTION

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes that can be burnt as fuel including municipal wastes, green waste (the biodegradable waste comprised of garden or park waste such as grass or flower cuttings and hedge trimmings), byproducts of farming including animal manures, food processing wastes, sewage sludge, black liquor from wood pulp or algae. It excludes organic material which has been transformed by geological processes into substances such as coal, oil shale or petroleum. Biomass is widely and typically grown from plants, including miscanthus, spurge, sunflower, switchgrass, hemp, corn (maize), poplar, willow and other trees, sugarcane, and oil palm (palm oil) with the roots, stems, leaves, seed husks and fruits all being potentially useful. The particular plant or other biomass source used is not important to the product liquid transportation fuel although the processing of the raw material for introduction to the processing unit will vary according to the needs of the unit and the form of the biomass.

Initially, the biomass is converted by pyrolysis into an oily liquid along with biomass char or coke as by-products of the pyrolysis. The biomass materials which are preferred are those which contain a higher proportion of lignins relative to celluloses and hemicelluloses since it is the lignins which, upon pyrolysis, produce greater quantities of the oils which are then treated with the liquid or supercritical water. A lignin content of at least 35 percent would produce greater amounts of the pyrolysis oil while at least 50 percent lignin would be preferred, if feasible. Since lignin plays a significant role in the carbon cycle, sequestering atmospheric carbon into the living vegetable, the use of the pyrolysis oil and its subsequent derivatives as fuels will be carbon-neutral; the celluloses and hemicelluloses produce char mostly or even exclusively. The pyrolysis of the biomass material involves heating the material in a reducing atmosphere with a limited oxygen supply, optionally with the addition of steam. In the fast pyrolysis of biomass, the material being treated is heated rapidly for only a few seconds, and this breaks it down into a large number of relatively small molecules. The resulting mixture is then cooled rapidly to prevent further reaction, giving a dark, oily liquid, known as bio oil or pyrolysis oil. Other products include char, mostly carbon solids, and a mixture of gases. Both of these can be used as fuels on site. Pyrolysis conditions will be selected according to the nature of the biomass but in general, temperatures from 300 to 500° C., typically 350 to 425° C. will normally be used; provided that the requisite conversion to the pyrolysis oil is achieved, the specific conditions used are not important.

The pyrolysis can carried out in the conventional manner with fast pyrolysis preferred for high liquid yield, characterized by rapid heating of the biomass particles and a short residence time of product vapors (0.5 to 2 s). Rapid heating implies that it is preferable for the biomass to be ground into fine particles and that the insulating char layer that forms at the surface of the reacting particles must be continuously removed.

Pyrolysis is slightly endothermic and various methods have been proposed to provide heat to the reacting biomass particles, but the preferred method is circulating fluidized beds: biomass particles are introduced into a circulating fluidized bed of hot sand or other solids. Gas, sand and biomass particles move together, with the transport gas usually being a recirculated product gas, although it may also be a combustion gas. High heat transfer rates from sand ensure rapid heating of biomass particles and ablation is stronger than with regular fluidized beds. A fast separator separates the product gases and vapors from the sand and char particles. The sand particles are reheated in fluidized burner vessel and recycled to the reactor.

Alternative methods that may be considered for use for the pyrolysis include the auger technology adapted from the Lurgi process for coal gasification, the ablative processes in which biomass particles are moved at high speed against a hot metal surface, the rotating cone process in which pre-heated hot sand and biomass particles are introduced into a rotating cone. Due to the rotation of the cone, the mixture of sand and biomass is transported across the cone surface by centrifugal force. Like other shallow transported-bed reactors relatively fine particles are required to obtain a good liquid yield although none are as practicable as the circulating fluidized bed.

Crude biomass pyrolysis liquid or bio-oil is dark brown and approximates to biomass in elemental composition. It is composed of a very complex mixture of oxygenated hydrocarbons with an appreciable proportion of water from both the original moisture and reaction product. Compositionally, the biomass pyrolysis oil will vary with the type of biomass, but is known to consist of oxygenated low molecular weight alcohols (e.g., furfuryl alcohol), aldehydes (aromatic aldehydes), ketones (furanone), phenols (methoxy phenols) and water. Solid char may also be present, suspended in the oil. The liquid is formed by rapidly quenching the intermediate products of flash degradation of hemicellulose, cellulose and lignin in the biomass. Chemically, the oil contains several hundred different chemicals in widely varying proportions, ranging from formaldehyde and acetic acid to complex high molecular weight phenols, anhydrosugars and other oligosaccharides. It has a distinctive odor from low molecular weight aldehydes and acids, is acidic with a pH of 1.5-3.8 (2.8) and is an irritant.

While the biomass begins with 10% to 15% moisture, the water content of the pyrolysis oil will typically range from about 15 wt % to an upper limit of about 30-50 wt %, depending on how the oil was produced and subsequently collected. The oxygen content is 40-50%, and only low levels of sulfur may normally be detected. The lower heating value is approximately 16-21 (17.5) MJ/kg. Pour point is typically $-12°$ C. to $-33°$ C., with no cloud point observable until $-21°$ C. The carbon residue is 17-23% wt (0.13% ash). Although the flash point is 40-100° C., the oil is not auto-igniting in a diesel engine. The viscosity of the bio-oil as produced can vary from as low as 25 cSt to as high as 1000 cSt.

Pyrolysis oil can tolerate the addition of some water, but there is a limit to the amount of water which can be added to the liquid before phase separation occurs. In other words, the liquid cannot be dissolved in water. It is miscible with polar solvents such as methanol, acetone, etc. and although referred to as an oil, will not mix homogeneously with hydrocarbon liquids. It can be considered as a micro-emulsion in which the continuous phase is an aqueous solution of holocellulose decomposition products that stabilize the discontinuous phase of pyrolytic lignin macro-molecules through mechanisms such as hydrogen bonding. but totally immiscible with petroleum-derived fuels. Aging or instability is believed to result from a breakdown of the emulsion structure, formation of hydrogen bonding interactions and chemical reactions of organic compounds present in the oil, e.g., phenols reacting with aldehydes to produce insoluble resin sediments.

The liquid contains many reactive species which lead to an increase in product viscosity in period of 12 months due to polymerization of these species. Pyrolysis liquids cannot be completely vaporised once they have been recovered from the vapor phase. If the liquid is heated to 100° C. or more in attempts to remove water (typically about 25% as produced) or distill off lighter fractions, it rapidly reacts and eventually produces a solid residue of around 50 wt % of the original liquid and some distillate containing volatile organic compounds and water.

Fast pyrolysis bio-oil has a higher heating value of about 17 $MJkg^{-1}$ as produced with the water that cannot readily be separated. The density of the liquid is very high at around 1.2 kg/litre compared to light fuel oil at around 0.85 kg/litre which equates to about 42% of the energy content of diesel or fuel oil on a weight basis, but 61% on a volumetric basis. Some characteristics of a typical wood-derived crude bio-oil are summarised in the table below.

| Property | Typical value |
| --- | --- |
| Moisture content | 20-30% |
| pH | 2.5 |
| Specific gravity | 1.20 |
| Elemental analysis | |
| C | 55-58% |
| H | 5.5-7.0% |
| O | 35-40% |
| N | 0-0.2% |
| Ash | 0-0.2% |
| HHV as produced | 16-19 MJ/kg |
| Viscosity (40° C., 25% water) | 40-100 cp |
| Solids (char) | ~0.5% |
| Vacuum distillation residue | up to 50% |

In the present process, the biomass oil, preferably after any desired removal of the biomass char, is brought into contact with superheated or supercritical water. Organic compounds will generally dissolve readily in superheated and supercritical water. Once the biomass is dissolved under these conditions, the water will efficiently break cellulose and other bonds as described below.

When superheated to temperatures below the critical temperature, the water maintained at autogeneous pressure or higher is still in the liquid state rather than the supercritical characteristic state in which the properties are intermediate those of the vapor state and the liquid. Above the critical point, supercritical fluids generally possess unique solvating and transport properties compared to liquids or gases. Supercritical fluids can have liquid-like densities, gas-like diffusivities, and compressibilities that deviate greatly from ideal gas behavior and under supercritical conditions, solid solubility often is enhanced greatly with respect to solubility in the gas or liquid solvent. Supercritical water in particular has the ability to dissolve materials not normally soluble in liquid water or steam and also promotes certain chemical reactions. The critical point of water is at 374° C. and about 22 MPa (3190 psi), at which it has a relative density of 0.322. When heated above this point, the superheated water becomes supercritical and, as such, will provide faster reaction rates for the conversion of the biomass oil.

Superheat to a temperature of at least 300° C. and preferably at least 374° C. at appropriate pressures, typically autogeneous pressures, to maintain liquidity will secure satisfactory reaction rates in the reaction with the oil. Pressures at temperatures of this order will typically be at least 15 MPa (2175 psi) and may be at least as high as 20 MPa (2900 psi).

When superheated liquid water is used in the range from above about 200° C. to below the critical temperature of water, 374° C., more preferably from about 250° C. to about 350 or 370° C., the pressures will be autogenous or higher. The corresponding vapor pressure needed to maintain water in the liquid state at these temperatures ranges from 1550 kPa (225 psi) at 200° C. to about 10.6 MPa (1532 psi) at 350° C. to about 22 MPa (3200 psi) at 374° C. Vapor pressure values are readily determinable by reference to standard texts such as the CRC Handbook of Chemistry and Physics and Steam Tables by J. H. Keenan, F. G. Keyes, P. G. Hill and J. G. Moore, Wiley-Interscience, New York, 1969.

The water employed in the process is preferably neutral, i.e. about pH 7 and substantially free of dissolved oxygen to minimize the occurrence of undesirable free radical reactions. The contacting is normally for a period of time ranging from about 0.1 second to several hours with shorter contact times being possible at higher temperatures; typically, contact times will be from 5 seconds to about 4 hours, and preferably 1 minute to 2 hours. Certain weight ratios of water to organic resource material drive the reaction at faster rates. Therefore, a weight ratio of water to biomass material in the range from about 0.5 to about 10 is preferred, and more preferably from about 0.5 to 5.0, most preferably 0.5 to 2.

High temperature water under autogenic pressure provides a significantly more favorable reaction medium for insoluble organic compounds than water up to its boiling temperature. The solvent properties of liquid water (density, dielectric constant) at high temperature are similar to those of polar organic solvents at room temperature, thus facilitating the solubility of organic compounds and their reactions. At 300° C., for example, water exhibits a density and polarity similar to those of acetone at room temperature: the solubility parameter decreases from 23.4 to 14.5 $cal/cm^3$. The dielectric constant drops rapidly with temperature, and at 300° C. has fallen from 80 (at 20° C.) to 2. Therefore, as the water temperature is increased, the solubility of non-polar organic compounds increases much more than expected for the natural effect of temperature and the reactions with the biological materials are facilitated to this extent.

Organic molecules containing oxygen functionalities such as are commonly found in biomass oil undergo a wide range of chemical reactions in neutral superheated or supercritical water. In superheated water, below the critical temperature of water, these reactions proceed mainly via ionic vs. thermal free radical pathways. Above the critical temperature, a competition between ionic and thermal free radical pathways is to be expected, with radical pathways catching up and finally predominating as temperature increases. Condensation type polymers, polymers containing, e.g., ester, ether, and amide linkages are likely to be cleaved to their starting materials at 300° C. and above and esters, ethers, sulfides, amines and even diaryl ethers cleave rapidly, carboxylic acids are decarboxylated (—$CO_2$) and aldehydes are decarbonylated (—CO). Such reactions effect cleavage of cross-links containing oxygen, nitrogen and sulfur moieties with the concurrent loss of much of these heteroatoms. These as well as many others, are facilitated by changes in the chemical and physical properties of water as temperature increases.

Superheated water at 350° C. and ~2400 psi (Hydrothermal Liquefaction (HTL) conditions) is in the liquid state and will react with e.g., lignin, to hydrolytically cleave linkages such as those typically found in biomass materials, including ethers, esters (including carbonate esters) and amides. Under these conditions, ester linkages in the biomass pyrolysis oil which have survived the pyrolysis are cleaved into an acid and an alcohol; the acid formed is then decarboxylated with the water acting as an acid, base or acid-base bi-catalyst (–log Kw=11.3 vs. 13.99 at 25° C.). The alcohol dehydrates under the same conditions to form an olefin. Amide bonds which are present cleave to form amines and diols; the diols can subsequently dehydrate to olefins while the amines lose ammonia to form alkanes or olefins. These reactions are strongly catalyzed by the acidity of the water at high temperature and autocatalyzed by acidic reaction products. Depolymerization and deoxygenation of biomass are therefore efficient under these conditions to form a product, typically in the form of a viscous, oily mass which can subsequently be worked up as a precursor of liquid transportation fuels, Since the water soluble conversion products (i.e., hydrolysis products) may include acidic products, basic products, reducing agents and oxidizing agents, that effect further conversion and upgrading of the biomass resource material, recycle enrichment of these materials presents another viable processing option.

An increase in the dissociation constant by three orders of magnitude allows water at temperatures of 200° C. or higher to act as an acid, base, or acid-base bi-catalyst without the need for costly and cumbersome neutralization and catalyst regeneration steps. The negative logarithmic ionic product of water [pKw] at 250° C. is 11, as compared to 14 at 20° C., which means that water becomes both a stronger acid and a stronger base as the temperature increases. Therefore, in addition to the natural increase in kinetic rates with temperature, both acid and base catalysis by water are enhanced at higher temperatures. Accordingly, the water/oil conversion may be carried out in the absence of any additional catalyst although trace amounts of acid can be added to facilitate these reactions while acidic species generated during the conversion process can autocatalyse the cleavage and deoxygenation reactions as described above.

The fuel precursors which result from the reaction are characterized by a lower molecular weight and lower oxygen content than most biomass products. This is a result of the unique conversion properties of the superheated/supercritical water when applied to biological materials. Depolymerization will result in the formation of liquid or semi-liquid products of varying viscosities which will combine with solids present in the mass to dissolve or disperse them and produce a rather viscous, reaction product which can be worked up in the same or similar manner to a petroleum crude following a filtration which is optional depending on how the product is eventually processed, of any remaining solids. For example, it may be used as coker feed, visbreaker feed, etc. Feed to an FCC unit is preferably hydrotreated to remove sulfur and nitrogen compounds which may remain and which, if not removed, will adversely affect catalyst performance and longevity in the cracking process. Hydrocracking is also an option.

The reaction with the water can be carried out in a reactor with walls suitably thick to withstand the pressures generated and fitted with a gas/liquid circulation system to permit the continuous circulation of the superheated/supercritical water as well as removal of gases such as oxygen, carbon monoxide and carbon dioxide which are evolved in the various reactions. Typically, the reactor will allow for the contact times between the water and the pyrolysis oil mentioned above, following which the reaction mass is withdrawn from the reactor, the water separated for recirculation and the water and residue de-gassed. Any sludge-like residue which remains can be sent to a coker or burned as fuel for the process.

The invention claimed is:

1. A process for the conversion of biomass pyrolysis oil into precursors for hydrocarbon transportation fuels which comprises contacting liquid superheated water or supercritical water with the biomass pyrolysis oil to depolymerize and deoxygenate the biomass into the transportation fuel precursors.

2. A process according to claim 1 in which the water is liquid superheated water at a temperature of at least 200° C.

3. A process according to claim 2 in which the water is liquid superheated water at a temperature of at least 300° C.

4. A process according to claim 1 in which the water is in the supercritical state at a temperature of at least 374° C. and a pressure of at least 22 MPa.

5. A process according to claim 1 in which the biomass pyrolysis oil is produced by the pyrolysis of biomass comprising plant matter, biodegradable wastes, byproducts of farming including animal manures, food processing wastes, sewage sludge, black liquor from wood pulp or algae.

6. A process according to claim 5 in which the pyrolysis oil is produced by the pyrolysis of biomass comprising the roots, stems, leaves, seed husks and fruits of miscanthus, spurge, sunflower, switchgrass, hemp, corn (maize), poplar, willow, sugarcane, and oil palm (palm oil).

7. A process according to claim 1 in which the pyrolysis oil is produced by the pyrolysis of biomass at a temperature of 350 to 425° C.

8. A process according to claim 1 in which the biomass pyrolysis oil comprises an emulsion of 15-50 wt % non-separable water content.

9. A process according to claim 1 in which the biomass pyrolysis oil comprises an emulsion having an oxygen content of 40-50%.

10. A process for the conversion of biomass into precursors for hydrocarbon transportation fuels which comprises:
pyrolyzing biomass at a temperature from 300 to 500° C. in a reducing atmosphere to form a biomass pyrolysis oil and contacting the biomass pyrolysis oil with liquid superheated water or supercritical water to depolymerize and deoxygenate the biomass into transportation fuel precursors.

11. A process according to claim 10 in which the water is liquid superheated water at a temperature of at least 200° C.

12. A process according to claim 11 in which the water is liquid superheated water at a temperature of at least 300° C.

13. A process according to claim 10 in which the water is in the supercritical state at a temperature of at least 374° C. and a pressure of at least 22 MPa.

14. A process according to claim 10 in which the biomass pyrolysis oil is produced by the pyrolysis of biomass comprising plant matter, biodegradable wastes, byproducts of farming including animal manures, food processing wastes, sewage sludge, black liquor from wood pulp or algae.

15. A process according to claim 14 in which the pyrolysis oil is produced by the pyrolysis of biomass comprising the roots, stems, leaves, seed husks and fruits of miscanthus, spurge, sunflower, switchgrass, hemp, corn (maize), poplar, willow, sugarcane, and oil palm (palm oil).

16. A process according to claim 10 in which the pyrolysis oil is produced by the pyrolysis of biomass at a temperature of 350 to 425° C.

17. A process according to claim 10 in which the biomass pyrolysis oil comprises an emulsion of 15-50 wt % non-separable water content.

18. A process according to claim 10 in which the biomass pyrolysis oil comprises an emulsion having an oxygen content of 40-50%.

\* \* \* \* \*